May 19, 1931.  C. C. HAIGLER  1,806,456
DECOY
Filed Aug. 12, 1929
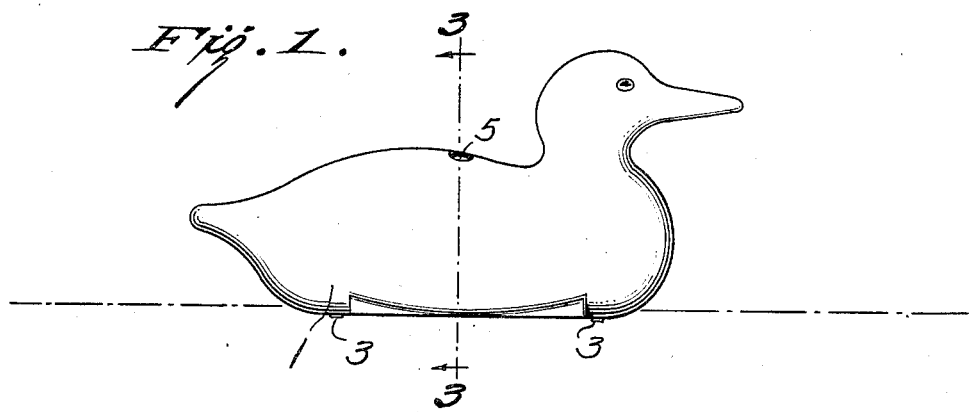
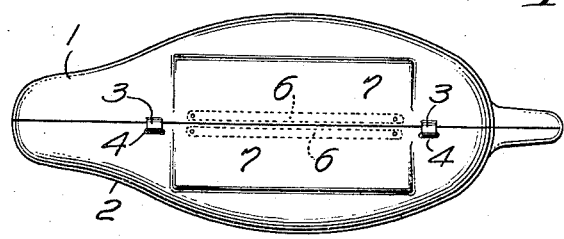
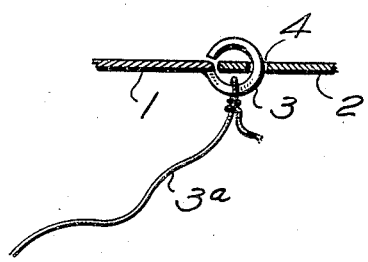
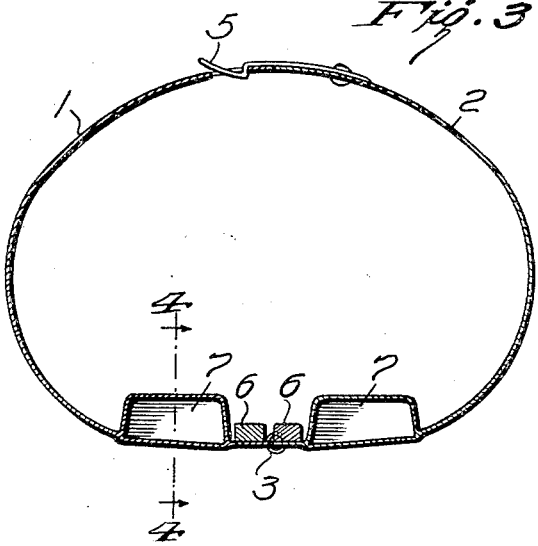
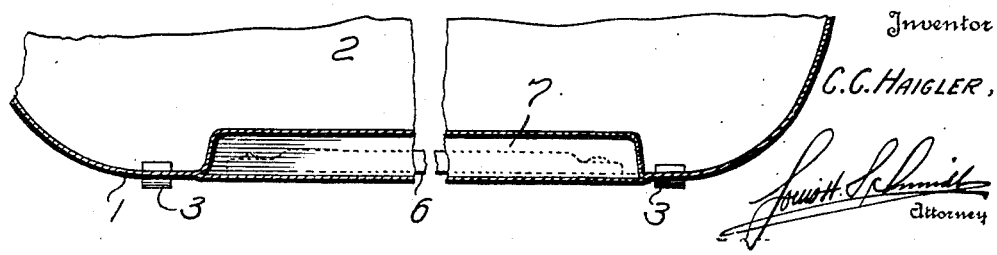
Inventor
C. C. HAIGLER,
Attorney Patented May 19, 1931

1,806,456

UNITED STATES PATENT OFFICE

CLAUDE C. HAIGLER, OF SAN JOSE, CALIFORNIA

DECOY

Application filed August 12, 1929. Serial No. 385,175.

This invention is directed to an improvement in decoy ducks, wherein the body is formed in two duplicate sections, hingedly connected to permit the body to be opened out for packing and storage, and closed into complete decoy form in a simple and convenient manner.

The primary object is the provision of a decoy in which the body is formed in two sections, each section provided with a closed air chamber, and with a weight, the relations of the parts being such that when the body sections are latched closed in decoy form, the two weights and air chambers are properly positioned to maintain the desired buoyancy of the body and keep it properly upright in the water.

The invention is illustrated in the accompanying drawings, in which:—

Figure 1 is a view in side elevation of the improved decoy.

Figure 2 is a bottom plan of the same.

Figure 3 is a section on the line 3—3 of Figure 1.

Figure 4 is a broken longitudinal section, showing the air chamber, the section being taken on the line 4—4 of Figure 3.

Figure 5 is a broken section, showing the means for hingedly connecting the sections.

The improved decoy is made of a two section body, the section 1 being substantially similar to section 2, and each including a formation appropriate to the decoy being represented as if longitudinally divided. In the present instance the decoy duck is divided lengthwise into the two sections 1 and 2, hingedly united at their bottom edges by substantially annular bands or rings 3, integrally formed with one of the sections and loosely fitted through openings 4 adjacent the meeting edge of the opposite section, as shown more particularly in Figures 2 and 5. These bands or rings 3, in addition to providing hinges for the relative movements of the sections, also afford a means whereby the usual anchor cord 3ᵃ for securing the decoys against drifting may be fastened. The upper meeting edges of the sections may be secured together at one or more points with latching means, such as a spring catch or catches 5, shown more particularly in Figure 3.

Within each section, near the lower meeting edge, there is secured a weight 6, and immediately adjacent the weight, there is also provided in each section, a hermetically sealed elongated box-like casing 7, to serve as a buoyant chamber. These chambers and weights are of such size and in such positions that when the sections of the body are connected in decoy forming relation, the buoyant chambers will support the body at the proper height above the surface of the water, and the weights will serve to maintain the body upright in correct position against casual disturbances.

The decoy has the advantage that the sections may be opened, and packed in superimposed and interfitting, and practically telescoped order, to thereby permit close storage, and protect the body from damage when not in use. The assembling of the sections into decoy form is readily and easily accomplished, as will be apparent. Since it is merely necessary to lift the spring catch 5, in order to release the sections so that they may be folded as for packing, it is obvious that this may be accomplished with a gloved hand or while the fingers are in a chilled condition.

Of course the body material is preferably waterproof and of sufficient rigidity to maintain its form, thus comparatively thin metal, stiffened rubberized fabric, or other suitable material may be employed.

Having thus described the invention, what is claimed as new, is:—

1. A decoy comprising two body sections, annular members hingedly connecting the sections at their lower meeting edges, said members serving for anchor-cord connections, a weight in each section, and a buoyant chamber in each section immediately adjacent the weight therein.

2. A decoy made in identical halves, each including a body portion having a straight edge defining the meeting lines of the body portions, each body portion being integrally formed to provide a buoyant chamber adjacent such straight edge, and a weight arranged in each body portion between the buoyant chamber and the straight edge, the weight extending longitudinally of the body portion in parallelism with the buoyant chamber.

3. A decoy made up of independent halves, means for connecting the halves for relative hinge movement, a buoyant chamber element formed integral with each half adjacent and extending parallel with the hinge edge of such half, and a weight secured within each half between the buoyant chamber and the hinge edge thereof, the weight extending parallel with and being substantially coextensive in length with the buoyant chamber.

In testimony whereof, I affix my signature.

CLAUDE C. HAIGLER.